United States Patent [19]
Nakamura et al.

[11] Patent Number: 5,568,295
[45] Date of Patent: Oct. 22, 1996

[54] CHIRAL SMETIC LCD WITH SMALL PRETILT ANGLE, SUBSTRATE RUBBED IN TWO OPPOSING DIRECTIONS, AND NO CHOLESTERIC PHASE OR TILT ANGLE > THE PRETILT PLUS INCLINATION ANGLES

[75] Inventors: Katsutoshi Nakamura, Hiratsuka; Shuzo Kaneko, Chigasaki; Etsurō Kishi, Sagamihara; Hirokatsu Miyata, Yokohama; Masaaki Shibata, Ninomiyamachi, all of Japan

[73] Assignee: Canon Kabushiki Kaisha, Tokyo, Japan

[21] Appl. No.: 318,432

[22] Filed: Oct. 5, 1994

[30] Foreign Application Priority Data

Oct. 8, 1993 [JP] Japan .................... 5-253053
Apr. 27, 1994 [JP] Japan .................... 6-089943

[51] Int. Cl.⁶ ........................... G02F 1/1337; G02F 1/13
[52] U.S. Cl. ................... 359/75; 359/76; 359/78; 359/100
[58] Field of Search ................ 359/75, 76, 78, 359/100

[56] References Cited

U.S. PATENT DOCUMENTS

| 4,367,924 | 1/1983 | Clark et al. ............ 359/56 |
| 4,886,619 | 12/1989 | Janulis ............ 252/299.1 |
| 5,172,255 | 12/1992 | Brosig et al. ............ 359/78 |
| 5,422,748 | 6/1995 | Yamashita et al. ............ 359/75 |

FOREIGN PATENT DOCUMENTS

| 0444705 | 9/1991 | European Pat. Off. . | |
| 0550846 | 7/1993 | European Pat. Off. . | |
| 64-055528 | 3/1989 | Japan | 359/76 |
| 64-055527 | 3/1989 | Japan | 359/76 |
| 195119 | 7/1992 | Japan . | |
| 247429 | 9/1992 | Japan . | |

OTHER PUBLICATIONS

Becker et al., "Alignment Properties of Rubbed Polymer Surfaces", vol. 132, 1986, Molecular Crystals and Liquid Crystals, pp. 167–180. (No Month).

Patel et al., "A Reliable Method of Alignment for Smectic Liquid Crystals", vol. 59, Ferroelectrics, 1984, pp. 137–144. (No Month).

*Primary Examiner*—Anita Pellman Gross
*Assistant Examiner*—Walter J. Malinowski
*Attorney, Agent, or Firm*—Fitzpatrick, Cella, Harper & Scinto

[57] ABSTRACT

A liquid crystal device is constituted by a pair of substrates, and a chiral smectic liquid crystal assuming at least two stable states disposed between the two substrates. At least one of the substrates is subjected to a uniaxial aligning treatment in two directions including a normal direction and a reverse direction substantially opposite to the normal direction. The liquid crystal is placed in an alignment state such that the liquid crystal provides an apparent tilt angle $\theta a$ which is a half of an angle between said two stable states, a tilt angle $H$ and a pretilt angle $\alpha$ with respect to a substrate surface, and forms smectic layers forming an inclination angle $\delta$ from a normal to the substrate surfaces satisfying: $H/2 < \theta a \leq H$ and $H > \alpha + \delta$. According to the liquid crystal device, an undesirable liquid crystal molecular movement along the substrates is effectively suppressed.

27 Claims, 7 Drawing Sheets

C2 ALIGNMENT  $H - \delta > \alpha$

C1 ALIGNMENT  Ⓗ+δ > α

FIG. 5A

C2 ALIGNMENT  Ⓗ−δ > α

CHIRAL SMETIC LCD WITH SMALL PRETILT ANGLE, SUBSTRATE RUBBED IN TWO OPPOSING DIRECTIONS, AND NO CHOLESTERIC PHASE OR TILT ANGLE > THE PRETILT PLUS INCLINATION ANGLES

FIELD OF THE INVENTION AND RELATED ART

The present invention relates to a liquid crystal device filled with a chiral smectic liquid crystal and used, e.g., in terminal displays of computers, word processors and typewriters, television receivers, view finders for video cameras, and light valves for projectors and liquid crystal printers. The present invention further relates to a liquid crystal apparatus equipped with such a liquid crystal device.

A liquid crystal device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) or H phase (SmH*) and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

With respect to a liquid crystal device using such a ferroelectric liquid crystal, it has been hitherto desired to develop a technique of appropriately controlling the alignment state of the liquid crystal to obtain a homogenous alignment state thereof, thereby improving display characteristics, such as contrast.

Further, in such a liquid crystal device, there have been posed several problems in addition to the alignment technique. One of such problems is occurrence of local coloring or tinging of a display device (generally along a side region thereof) during the drive of the device. The phenomenon is described with reference to FIG. 1A (a plan view of a ferroelectric liquid crystal device) and FIG. 1B (an illustration of liquid crystal molecular behavior in the device).

Figure 1A:
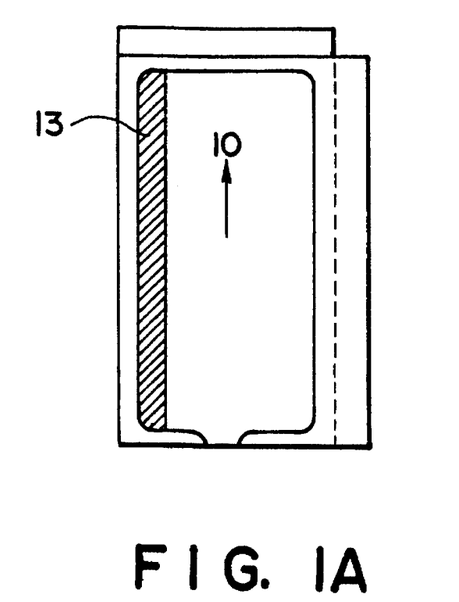
FIGS. 1A and 1B are schematic views for illustrating a liquid crystal molecular movement.

More specifically, when such a device is continually driven for a long period, a side or edge region 13 of the display area is colored or tinged in yellow. Such a phenomenon not only deteriorates the appearance of the picture but also can change the switching characteristics of the related liquid crystal pixels. It has been found that such a phenomenon has been caused by movement of liquid crystal molecules toward the region 13 to increase the liquid crystal layer thickness (which may be also called a spacing between the substrates or a cell thickness) at the region 13.

Figure 1B:
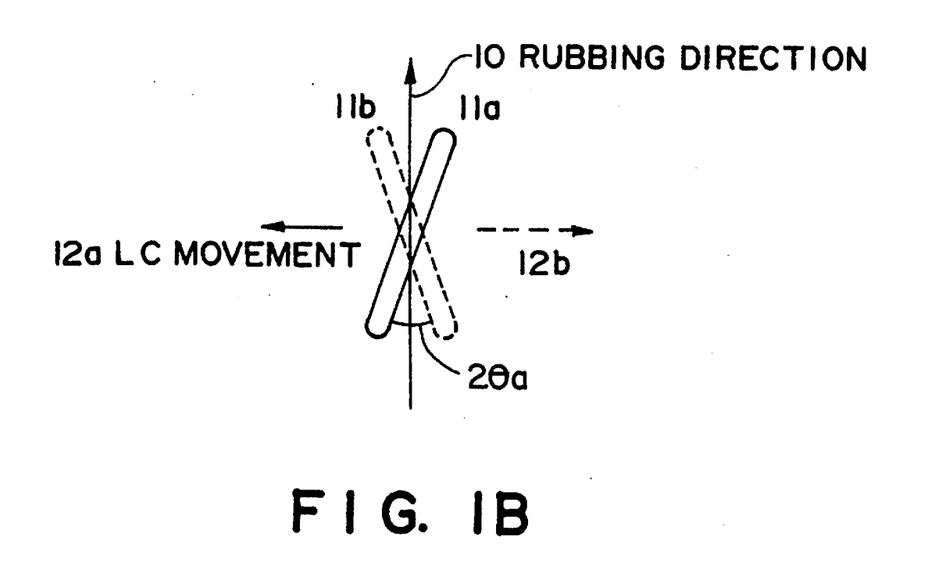

As a result of our study for solving the above problem, we have had a presumption that the liquid crystal movement is attributable to an electrodynamic effect caused by perturbation of dipole moments of liquid crystal molecules in an AC electric field given by drive pulses. It is also presumed that the liquid crystal molecular movement direction 12a or 12b is dependent on the average molecular axis direction 11a or 11b in combination with a rubbing direction 10 as shown in FIG. 1B.

As the liquid crystal molecular movement direction depends on the rubbing direction and in view of the fact that the pretilt state of liquid crystal molecules at the substrate boundaries is determined by the rubbing, it is presumed that the liquid crystal molecular movement depends on the pretilt state or the direction of bending of smectic layers which is caused so as to be stable due to an elastic energy change caused by the pretilt.

Further, there has been also found a tendency that the direction and rate of the liquid crystal movement are changed depending on the magnitude of a boundary controlling force controlled by the rubbing treatment described above, etc.

Another problem regarding the alignment state in a ferroelectric liquid crystal device is that the first stable state and the second stable state of the bistable states of liquid crystal molecules have different degrees of stability, thus causing an asymmetry of voltage threshold (peak value or width of a voltage pulse) for switching between the two stable states.

The above-mentioned difference between the two stable states is particularly noticeable in an alignment state providing a low pretilt angle of liquid crystal at the substrate boundaries. This is considered to be an essential problem of a ferroelectric liquid crystal of which the switching between the bistable states is performed while being affected by an interaction between the substrate boundaries and the liquid crystal molecules.

Particularly, in a liquid crystal device comprising a device structure and a liquid crystal material assuming an alignment state having a low pretilt angle, it has been sometimes practiced to apply an asymmetrical aligning treatment to the two substrates sandwiching a ferroelectric liquid crystal in order to enhance a homogeneity of alignment state such that only one of the two substrates is supplied with a uniaxial aligning treatment and the other is supplied with a non-uniaxial aligning treatment. In such a case, the difference of stability between the bistable states can be further affected by the polarity of the substrate subjected to a uniaxial aligning treatment and mutual interaction between liquid crystal molecules, so that an unsatisfactory or incomplete bistability which may be attributable to such factors has been observed as a noticeable phenomenon.

SUMMARY OF THE INVENTION

In view of the above-mentioned problems, an object of the present invention is to provide a liquid crystal device using a chiral smectic liquid crystal wherein a homogeneous liquid crystal alignment state is developed satisfactorily so as to provide a high contrast, the movement of liquid crystal molecules during drive is suppressed, and the asymmetry of voltage threshold of the liquid crystal is alleviated to develop a good bistability.

According to the present invention, there is provided a liquid crystal device, comprising: a pair of substrates, and a chiral smectic liquid crystal assuming at least two stable states disposed between the two substrates; wherein at least one of the substrates is subjected to a uniaxial aligning treatment in two directions including a normal direction and a reverse direction substantially opposite to the normal direction; and the liquid crystal is placed in an alignment state such that the liquid crystal provides an apparent tilt angle $\theta a$ which is a half of an angle between said two stable states, a tilt angle $\textcircled{H}$ and a pretilt angle $\alpha$ with respect to a substrate surface, and forms smectic layers forming an inclination angle $\delta$ from a normal to the substrate surfaces, satisfying: $\textcircled{H}/2 < \theta a \leq \textcircled{H}$ and $\textcircled{H} > a + \delta$.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

We have had a knowledge that the direction and rate of liquid crystal molecular movement during a long-term drive of a chiral smectic liquid crystal device are closely related with external factors such as a temperature and intensity and frequency of electric field applied to the liquid crystal device. The movement has been also found to depend on internal factors of a cell, such as angle and direction of pretilt at the substrate boundaries, alignment state and other properties, such as magnitude of spontaneous polarization Ps, magnitude of cone angle $\textcircled{H}$, and smectic layer inclination angle $\delta$ of chiral smectic liquid crystal molecules.

Among these factors, the temperature, electric field intensity and electric field frequency have a relationship of trade off with a factor, such as Ps, affecting the response speed and are constrained by design factors, such as frame frequency and duty ratio of a liquid crystal apparatus, such as a display apparatus using the liquid crystal device, so that it is difficult to make a remarkable improvement based on these factors.

Accordingly, we have made extensive study by independently changing properties of liquid crystal materials and device design factors inclusive of alignment properties such as a pretilt angle $\alpha$. As a result, it has been found possible to obtain a uniform alignment state stably providing a high contrast and also suppress the liquid crystal molecular movement during drive of a liquid crystal device by controlling the directionality of pretilt and smectic layer inclination angle so as to satisfy a certain relationship with a cone angle $\textcircled{H}$ of liquid crystal molecules.

It has been also found that the abovementioned factors causing a liquid crystal molecular movement in a liquid crystal device are also related with the occurrence of unsatisfactory or incomplete bistability in a device subjected to an asymmetrical aligning treatment. Particularly, the asymmetrical thresholds depend on factors determining the directionality of pretilt angle $\alpha$ and the smectic layer inclination angle, so that it has been found possible to control these factors based on physical properties of a liquid crystal thereby remarkably reducing adverse effects on the bistability.

More specifically, according to the present invention, at least one substrate is subjected to a uniaxial aligning treatment in normal and reverse two directions in a controlled manner so as to suppress or cancel the tendency or directionality of liquid crystal molecules raising their heads from a substrate, suppress the liquid crystal molecular movement and establish a prescribed relationship among pretilt angle $\alpha$, apparent tilt angle $\theta a$, layer inclination angle $\delta$ and cone angle $\textcircled{H}$. Further, as a result of the uniaxial aligning treatment in normal and reverse two directions, the directionality of smectic layer inclination or bending is canceled and the occurrence of asymmetrical thresholds is suppressed in a manner of resisting external factors while accomplishing a good alignment state.

Hereinbelow, the characterizing features of the present invention will be described in further detail.

A principal device feature of the present invention is that the boundary surface contacting a liquid crystal of at least one substrate is subjected to a uniaxial aligning treatment in two directions including a normal direction and a reverse direction. Such a uniaxial aligning treatment may preferably be performed by rubbing an insulating layer (alignment control layer) provided on a substrate (electrode plate) or directly the substrate. Alternatively, such a uniaxial aligning treatment may also be effected by forming a thin film by oblique evaporation or according to the LB (Langmuir-Blodget) method.

In the present invention, the uniaxial aligning treatment is performed in normal and reverse two directions so as not to weaken the alignment control force but to macroscopically cancel the directionality of the normal and reverse directions, particularly the directionality of pretilt affecting the liquid crystal molecular movement and the asymmetrical thresholds. Accordingly, a latter uniaxial aligning treatment (e.g., in a reverse direction) should be performed so as not to completely remove the trace of a former uniaxial aligning treatment (e.g., in a normal direction). For this reason, the latter uniaxial aligning treatment should desirably be performed in a weaker intensity (e.g., a weaker rubbing intensity). In case of effecting the uniaxial aligning treatment in three or more times in successively alternating directions, it is preferred that the treatment intensity is gradually weakened.

More specifically, e.g., in case of performing a rubbing in a normal direction and then in a reverse direction, it is preferred that the latter rubbing in the reverse direction is performed in an intensity which is ca. 1/30 to 1/3 times that in the former rubbing in the normal direction. It is possible to repeat the rubbing further several times in alternate directions. Also in such a case, it is preferred to weaken the treatment intensity at least in the last one or two times of treatment sufficiently compared with the treatment intensity in a previous treatment.

Figure 2A:
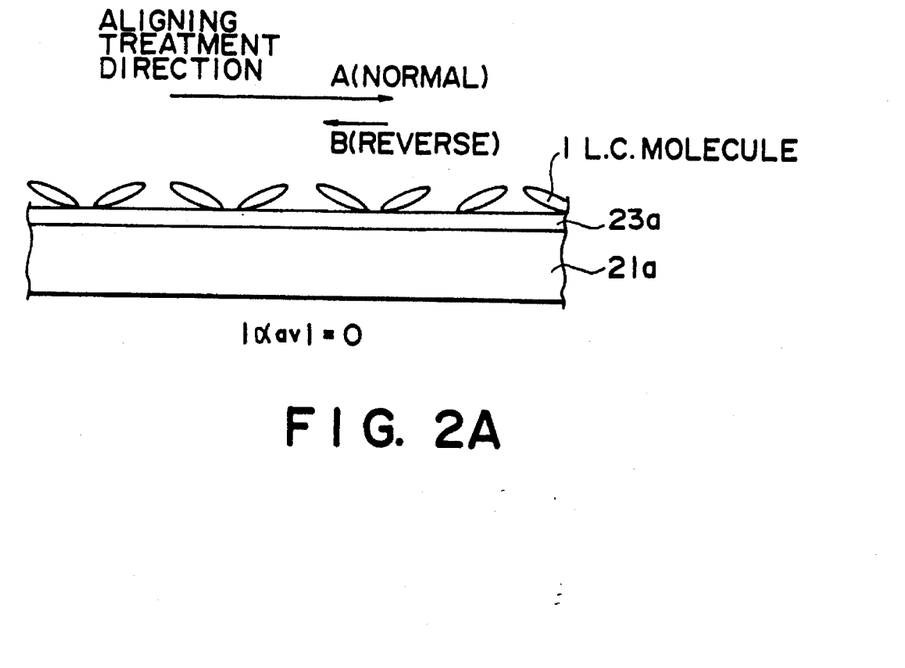
FIGS. 2A and 2B are schematic views for illustrating relationships between a uniaxial aligning treatment and surface pretilt of liquid crystal molecules at substrate boundaries in liquid crystal devices according to the invention.
Figure 2B:
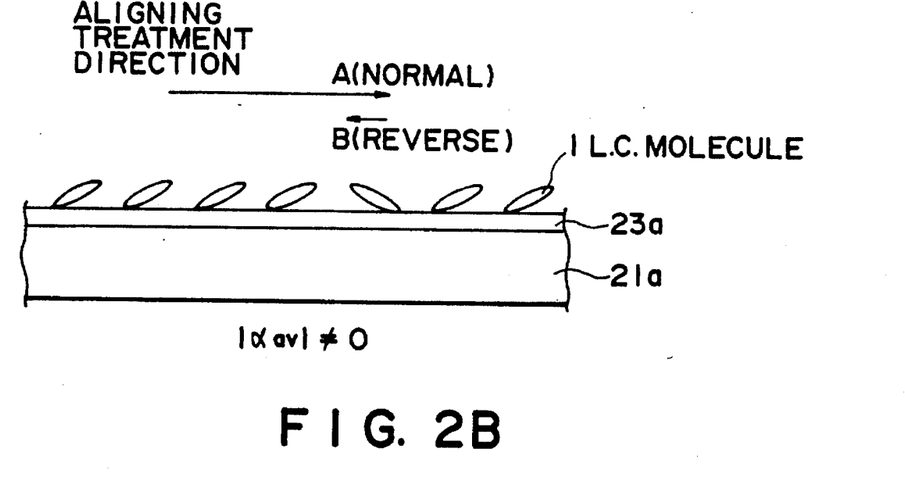

A relationship between a uniaxial aligning treatment and the resultant pretilt of liquid crystal molecules in the present invention will now be described with reference to FIGS. 2A and 2B. More specifically, FIGS. 2A and 2B respectively show a state wherein an insulating film (alignment control layer) 23a formed on a substrate 21a is subjected to a uniaxial aligning treatment as by rubbing in mutually opposite two (i.e., normal and reverse) directions whereby liquid crystal molecules 1 are aligned to be inclined at a prescribed angle (pretilt angle) with respect to the boundary with the alignment control film 23a. FIG. 2A shows a state wherein almost equal numbers of liquid crystal molecules are aligned (inclined) in response to the treatments in the normal and reverse directions so as to provide an absolute value of average pretilt angle $|\alpha_{av}|$ of substantially zero, that is, the directionality of the pretilt is substantially canceled. On the other hand, FIG. 2B shows a state wherein the number of liquid crystal molecules inclined in response to a uniaxial aligning treatment in one direction (normal direction in this embodiment) is larger than the number of liquid crystal molecules inclined in response to a uniaxial aligning treatment in the other direction (reverse direction in this embodiment) so as to provide an absolute value of average pretilt angle $|\alpha_{av}|$ not equal to zero, that is, the directionality of pretilt is left to some extent.

Figure 3A:
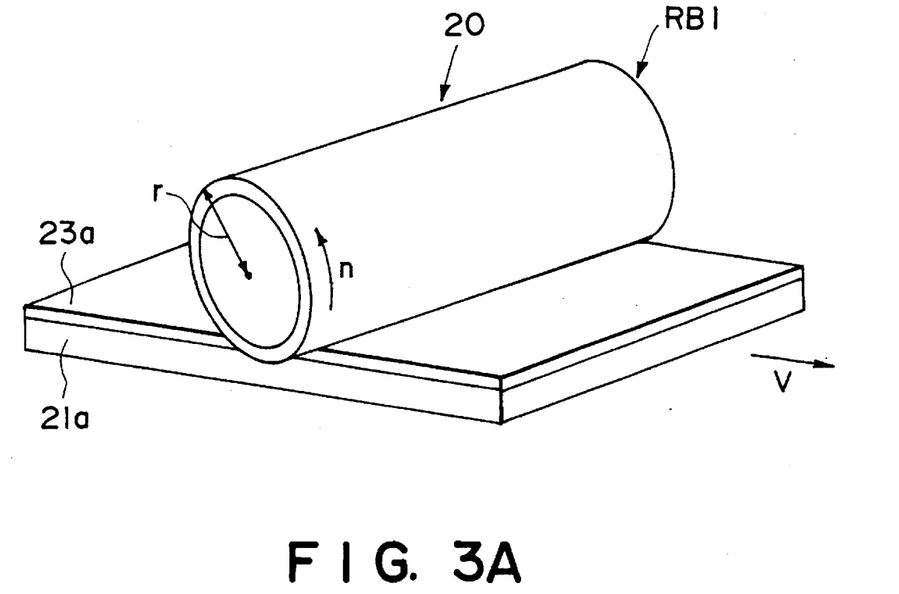
FIGS. 3A and 3B are a perspective view and a side view, respectively, for illustrating a rubbing treatment applied to a liquid crystal device according to the invention.
Figure 3B:
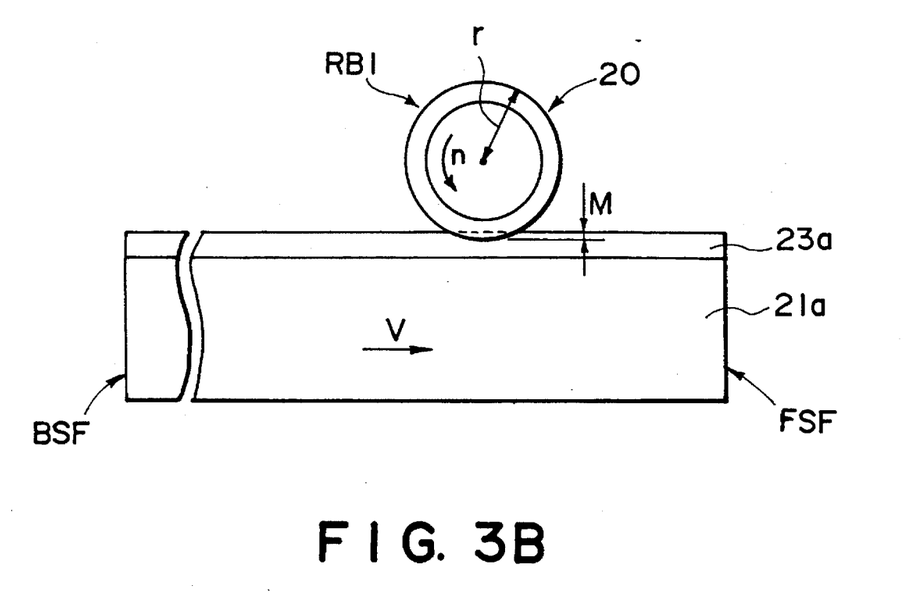

A manner of rubbing as a preferred embodiment of uniaxial aligning treatment adopted in the present invention will now be described with reference to FIGS. 3A and 3B, which are a perspective view and a side view, respectively, showing a manner of rubbing an insulating layer 23a disposed on a substrate 21a. Referring to FIGS. 3A and 3B, a rubbing roller RB1 surfaced with a rubbing cloth 20 and is rotated about its axis in an arbitrary direction (denoted by n) while applying a pressing force onto the substrate 21a depending on a pressing depth M (FIG. 3B), and the substrate 21a is fed in a desired direction and at a desired speed (denoted by V).

A reciprocal rubbing (i.e., rubbing in normal and reverse two directions) may be performed by first feeding a substrate 21a with its one end FSF as a leading end in the moving direction V and subsequently feeding the substrate 21b with its the opposite end BSF as a leading end in the same moving direction V. This alternate feeding (i.e., rubbing in alternate directions) can be repeated further, if desired.

As another method, the reciprocal rubbing can be effected without using a roller but by rubbing (the alignment control film 23a on) the substrate 21a with a rubbing cloth while adjusting the pressing depth M and the substrate feed rate V.

Another characteristic feature of the present invention is that a specific alignment state characterized by several parameters is developed by appropriate selection of device structure inclusive of an alignment film material and a liquid crystal material.

In the liquid crystal device of the present invention, of a twist alignment state and a uniform alignment state is established so as to provide improved brightness and contrast. The uniform alignment state is characterized by a relationship of $\textcircled{H}/2<\theta a\leq\textcircled{H}$ representing a switching condition determined by a liquid crystal material and an alignment state, wherein $\theta a$ represents an apparent tilt angle which is a half of an angle between the two bistable states, and $\textcircled{H}$ represents a tilt angle (cone angle) $\textcircled{H}$ which is a half of cone apex angle of a chiral smectic liquid crystal forming in a bulk helical state, i.e., a physical property of the chiral smectic liquid crystal.

Figure 4:
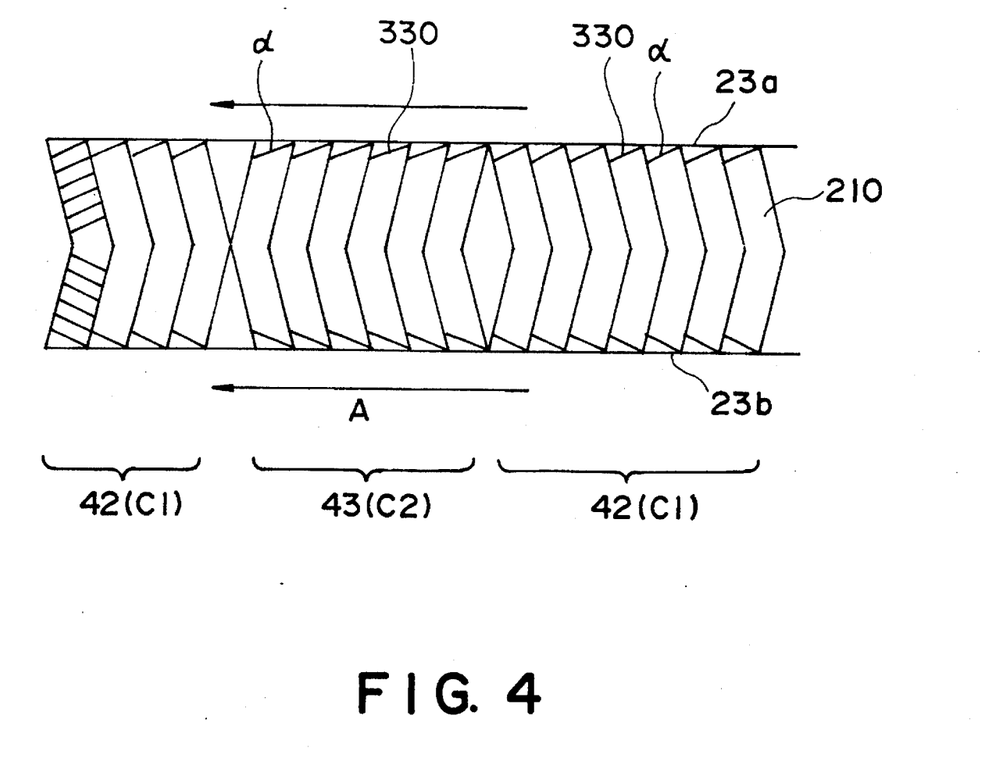
FIG. 4 is a schematic view of a state of a chiral smectic liquid crystal for illustrating C1 alignment and C2 alignment.
Figure 5A:
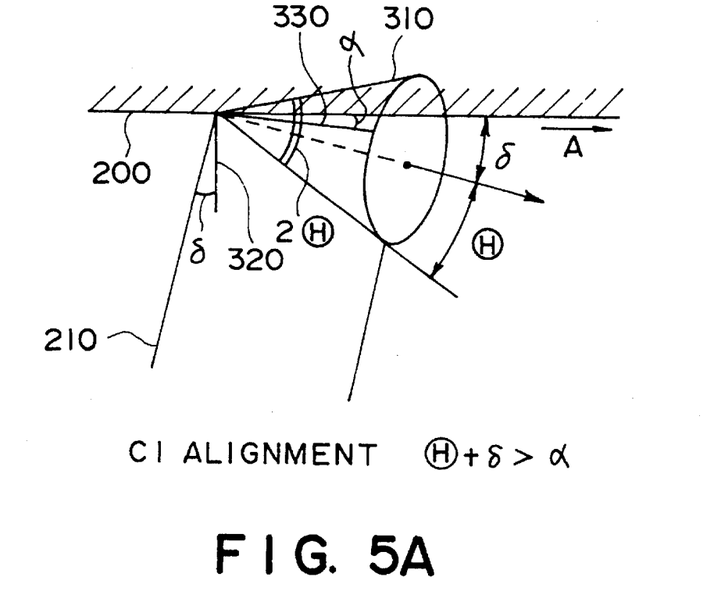
FIGS. 5A and 5B are schematic views for illustrating liquid crystal alignment states in the vicinity of a substrate boundary in C1 alignment and C2 alignment, respectively.
Figure 5B:
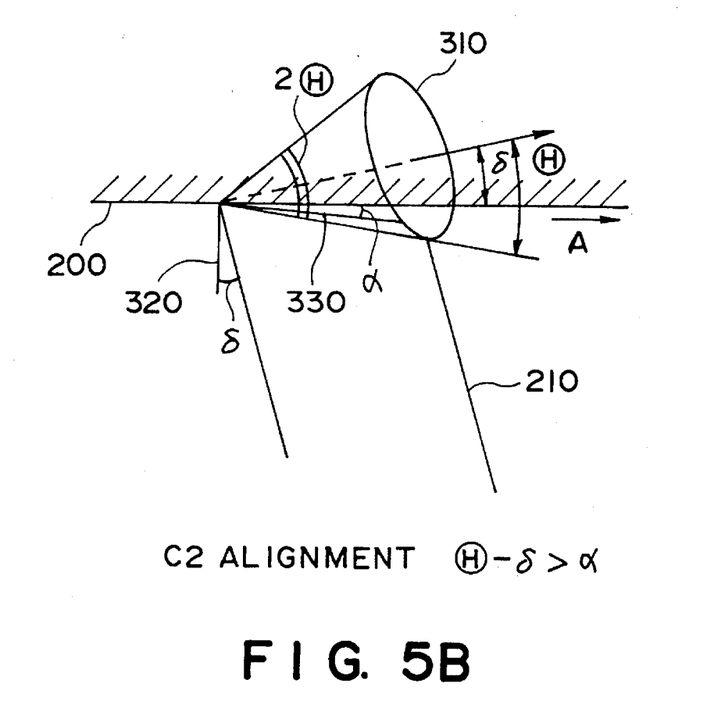

On the other hand, it is also known that a chiral smectic liquid crystal in the uniform alignment state can assume C1 alignment (state) and/or C2 alignment (state) as shown in FIG. 4 and FIGS. 5A and 5B.

More specifically, a chiral smectic liquid crystal generally has a (smectic) layer structure including a plurality of (smectic) layers each composed of plural molecules, and the smectic layer thickness (generally called "layer spacing") may shrink when it is cooled to cause a phase transition from SmA (smectic A) phase to SmC (smectic C) phase or SmC* (chiral smectic C) phase, thereby forming a structure (so-called "chevron structure") wherein the smectic layers 210 are bent at a mid point between the substrates 21a and 21b as shown in FIG. 4, while the above tendency can depend on a liquid crystal material used. In the chevron structure, there arise two liquid crystal alignment states (C1 alignment (42) and C2 alignment (43)) which are distinguished from each other by a difference in bending direction of the above-mentioned smectic layer 210 bending relative to the direction of liquid crystal molecular pretilt ($\alpha$ as shown in FIGS. 4, 5A and 5B).

Further to say, liquid crystal molecular directors 330 in the vicinity of C1 alignment and C2 alignment are present on cones 310 shown in FIGS. 5A and 5B, respectively. As a result of rubbing, a liquid crystal molecule at a substrate boundary forms a pretilt angle $\alpha$ (angle between a substrate 200 and a liquid crystal molecule 330) so that it raises its head in the direction of rubbing (i.e., the direction of uniaxial alignment treatment A shown in FIGS. 4, 5A and 5B). As a result, the following relationship should be satisfied among the liquid crystal cone angle $\textcircled{H}$, pretilt angle $\alpha$ and a layer inclination angle $\delta$ (angle between a substrate normal 320 and a liquid crystal (or smectic) layer 210 shown in FIGS. 5A and 5B).

For C1 alignment: $\textcircled{H}+\delta>\alpha$,

For C2 alignment: $\textcircled{H}-\delta>\alpha$.

In the present invention, in addition to the above characteristic feature that at least one substrate is subjected to a uniaxial aligning treatment in normal and reverse two directions so as to cancel the macro-directionality of pretilt of liquid crystal molecules and substantially remove the directional component causing the liquid crystal molecular movement and the asymmetrical thresholds, the device conditions are set so as to allow both of the C1 alignment and C2 alignment, reduce the average inclination angle of smectic layers due to co-presence of C1 and C2 alignments and provide a substantially defect-free, homogeneous alignment state. More specifically, the parameters $\textcircled{H}$, $\delta$ and $\alpha$ are set to satisfy: $\textcircled{H}>\alpha+\delta$ so as to also allow C2 alignment. It is further preferred to satisfy $\textcircled{H}/2>\alpha+\delta$ in order to stably form a uniform alignment state.

In the alignment state given by the present invention, the occurrence of particularly problematic defects as described above has not been observed. On the other hand, within the conditional range allowed by the present invention, however, an increase of zigzag defects in a minute region, such as a pixel, can be observed, e.g., as $\alpha$ or $\delta$ increases. From the observation, it is considered that the occurrence of defects in the present invention may be effected according to the following mechanism. That is, the entire region of liquid crystal is composed of domains having mutually different pretilt angles and layer structures, and the growth of each domain is suppressed so that every domain is suppressed to be a minute one. As a result, when the entire region is viewed macroscopically, the liquid crystal molecular movement directionality and the directionality of monostabilization (i.e., asymmetrical thresholds) of the individual domains are canceled with each other.

Further, as a result of observation of microscopic regions in the bulk phase and at the boundaries between the liquid crystal layer and the alignment control films, it has been confirmed that the above-mentioned minute defects remarkably disappear or change into hardly recognizable ones as the parameter α or δ becomes smaller.

Through various experimental results of ours, large effects of providing a good alignment state free from alignment defects and preventing the liquid crystal molecular movement have been obtained when the pretilt angle α is at most 3 degrees, the smectic layer inclination angle δ is at most 8 degrees and the cone angle Ⓗ is at least 12 degrees. A particularly large effect is obtained when the cone angle Ⓗ is at least 22 degrees. Further, as will be understood in view of Examples described hereinafter, particularly good results are obtained when the average pretilt α (=$α_{AV}$) is suppressed to be at most 2 degrees.

In the liquid crystal device according to the present invention, the liquid crystal layer may preferably assume substantially a bookshelf structure. In this case, the liquid crystal alignment defects can be reduced to provide a higher brightness and a higher contrast.

Incidentally, in the present invention, the pretilt angle α represents an average pretilt angle $α_{av}$ attained by the above-mentioned aligning treatment in normal and reverse directions, if the condition of Ⓗ>α+δ is satisfied.

In the liquid crystal device according to the present invention, the above-mentioned device conditions regarding the liquid crystal alignment state may be realized by other device factors, such as a liquid crystal material, a material for the alignment control layers and a relationship between aligning treatments applied to the pair of substrates.

The liquid crystal material used in the present invention may be a chiral smectic liquid crystal material, i.e., a liquid crystal material having a chiral smectic phase inclusive of chiral smectic C phase (SmC*) as a representative and also chiral smectic H phase (SmH*), I phase (SmI*), K phase (SmK*) and G phase (SmG*) which may be also represented by SmC* in some cases. More specifically, the liquid crystal material may for example comprise a composition including, as a principal constituent, a mesomorphic compound having a biphenyl skeleton or a phenylpyrimidine skeleton as a mesogen group and various hydrocarbon groups optionally substituted with a halogen as side or terminal chains, and also at least one species of chiral dopant.

Further, as a liquid crystal material suitable for developing the above-mentioned bookshelf structure, it is preferred to use a liquid crystal material showing a small layer inclination angle δ and a large cone angle Ⓗ. Examples of such a liquid crystal material may include those showing no or only suppressed cholesteric (Ch) phase. Such a liquid crystal material may for example include a mesomorphic compound having a mesogen group comprising a ring structure, such as a naphthalene skeleton or a phenylpyrimidine skeleton, and a fluorocarbon chain group. More specific examples thereof may include chiral mesomorphic compounds having a ring structured skeleton of phenylpyrimidine, phenylbenzoate, biphenyl, naphthalene, etc., and also a fluoroalkyl chain group, particularly a terminal perfluoroalkyl group as disclosed in U.S. Pat. No. 4,886,619; and achiral mesomorphic compounds having a ring-structured skeleton and a fluoroalkyl chain group, particularly a terminal perfluoroalkyl group.

The alignment control layer formed on a substrate in the liquid crystal device according to the present invention may comprise a film of an organic polymer, such as polyimide, polyamide, polyvinyl alcohol, or polyester, or a film of an inorganic material, such as silicon oxide, or silicon nitride. It is particularly preferred to use a material such as a polyimide (e.g., "LP-64" available from Toray K.K.) or a polyamide, having a tendency of providing a low pretilt angle.

Figure 6:
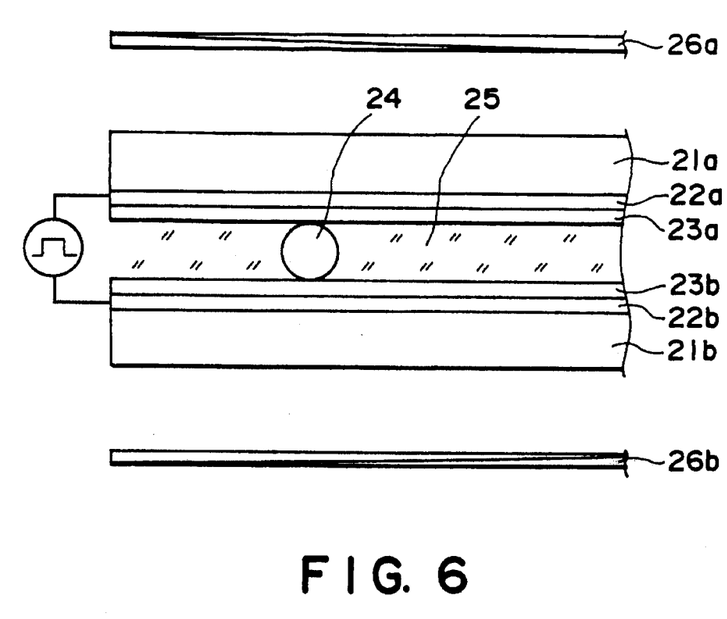
FIG. 6 is a sectional view for illustrating a structure adopted in an embodiment of the liquid crystal according to the invention.

FIG. 6 shows a structure adopted in an embodiment of the liquid crystal device according to the present invention. Referring to FIG. 6, the liquid crystal device includes a pair of substrates 21a and 21b having successively thereon transparent electrodes 22a or 22b and an alignment control layer 23a or 23b, and a chiral smectic liquid crystal 25 and spacer beads 24 disposed between the substrates.

At least one of the substrates 21a and 21b should be transparent and may for example comprise glass (as a preferred example), a polymer, quartz, metal such as Si or Al, a semiconductor or an insulating material. The transparent electrodes 22a and 22b may for example comprise tin oxide, indium oxide, or indium tin oxide (ITO).

The alignment control layers 23a and 23b may comprise an organic material or an inorganic material as described above, and at least one thereof is subjected to a uniaxial aligning treatment in normal and reverse two directions so as to provide a small pretilt angle α (=$α_{AV}$) of at most 3 degrees, preferably at most 2 degrees. Incidentally, it is possible to dispose a short circuit-preventing insulating layer 22a (or 22b) of, e.g., $Ta_2O_5$, $SiO_2$, or SiN between the transparent electrode 21a (or 21b) and the alignment control layer 23a (or 23b).

The spacer 24 may comprise fine particles of, e.g., alumina or silica. A periphery of the pair of substrates may be sealed with a sealing member (not shown) of, e.g., an epoxy resin to provide a cell structure, which is filled with the liquid crystal 25.

The thus-formed liquid crystal cell structure is sandwiched between a pair of polarizers 26a and 26b. A backlight (not shown) may be further provided outside one of the polarizers 26a and 26b in order to provide a transmission-mode device.

In a preferred embodiment of the liquid crystal device having the above-mentioned structure, a pair of the substrates 21a and 21b may be provided with an asymmetrical aligning treatment such that only one of the substrates 21a an 21b is subjected to a uniaxial aligning treatment in normal and reverse two directions and the other is provided with a non-uniaxial aligning surface, e.g., by having an alignment control film of a material identical to or different from that of the opposite alignment control layer but not subjected to a uniaxial aligning treatment, and a liquid crystal material not showing cholesteric phase may be disposed between the substrates, thereby forming a homogeneous, defect-free alignment state.

The parameters of pretilt angle α (=$α_{AV}$) and layer inclination angle δ discussed herein were measured in the following manner and the degree of liquid crystal molecular movement was evaluated in the following manner.

Pretilt angle α

The measurement was performed according to the crystal rotation method as described at Jpn. J. Appl. Phys. vol. 19 (1980), No. 10, Short Notes 2013.

More specifically, a sample cell was prepared by applying a pair of substrates each other so that the inclination of liquid crystal at the boundaries with two substrates were parallel and identical to each other, and the cell was then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha$, $$\sin 2\alpha = \frac{-2\sin\phi_x}{(n_o + n_e)\sqrt{1 - (\sin\theta_x/n_o)^2}}$$

wherein $n_o$ denotes the refractive index of ordinary ray, and $n_e$ denotes the refractive index of extraordinary ray.

Layer inclination angle $\delta$ in SmC* phase

Ca. 70 μm-thick glass sheets were subjected to an aligning treatment and applied to each other to form a cell which was then filled with a chiral smectic liquid crystal and cooled for alignment. The resultant cell was subjected to an ordinary X-ray diffraction analysis to evaluate a layer inclination angle $\delta$.

Liquid crystal molecular movement

Figure 7A:
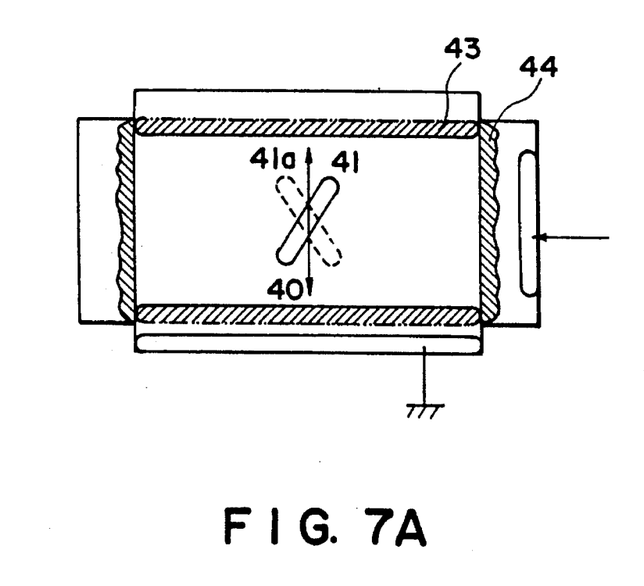
FIG. 7A is a schematic view of a liquid crystal device for illustrating a manner of evaluating a liquid crystal molecular movement and FIG. 7B show two voltage waveforms used therefor, respectively, in an experimental example described hereinafter.
Figure 7B:
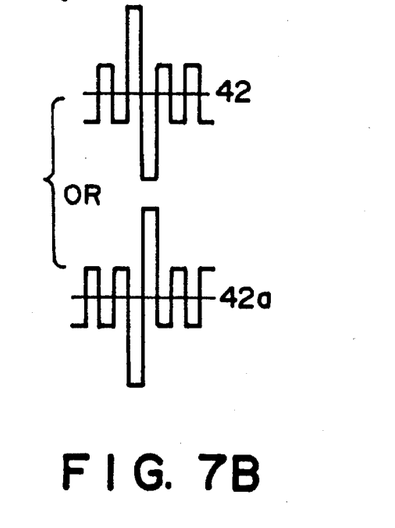

The measurement method will be described with reference to FIGS. 7A and 7B, of which FIG. 7A is a schematic plan view of a sample liquid crystal cell and FIG. 7B shows signals applied to the sample cell.

A pair of substrates prepared by a method (according to or not according to the present invention) are applied to each other so that an aligning treatment direction 40 is disposed perpendicular to printed mutually parallel stripe spacers 43, and a gap therebetween is filled with a liquid crystal without sealing on both sides to form a sample cell. Then, silicone oil 44 is dripped on both unsealed sides as a marker or indicator of liquid crystal molecular movement, and a writing waveform 42 or 42a (pulse voltage=20 volts, pulse width=30 μsec (1.2 times the threshold), bias ratio= ⅓, duty ratio=1/1000) as shown in FIG. 7B is applied to the cell so that the resultant liquid crystal molecular axis is aligned in a direction 41 or 41a as shown in FIG. 7A. When the liquid crystal molecular movement is caused as a result of the drive, the silicone oil is pulled into the cell to indicate the degree of the liquid crystal movement. In the experiments described hereinafter, the rate of liquid crystal molecular movement was evaluated by the distance of the marker introduced into the cell.

Now, the present invention will be described more specifically based on experimental examples.

Example 1

Two 1.1 mm-thick glass substrates each provided with a ca. 150 nm-thick ITO transparent electrode film were respectively coated with a 0.7 wt. % solution in an NMP/nBC (=2/1) mixture solvent of a polyimide precursor ("LP-64", mfd. by Toray K.K.) dripped thereon by spin coating at 2700 rpm for 20 sec., followed by drying at 80° C. for 5 min. and hot baking at 270° C. for 1 hour to form a 5 nm-thick alignment control film.

Twelve pairs of substrates each provided with an alignment control film in the above-described manner were subjected to an aligning treatment by rubbing with nylon cloth by using an apparatus shown in FIGS. 3A and 3B. The respective pairs of substrates were first rubbed in a normal direction at a rubbing intensity RS (=NM (2πrn/V−1))=214 (mm), wherein N: a number of rubbing applied to a substrate (times), M: a pressing depth of the rubbing roller against the substrate (mm), r: a radius of the rubbing roller (mm), n: a rotation speed of the rubbing roller (RPM), and V: a substrate feed rate (mm/min) (FIGS. 3A and 3B). Then, the respective substrates were rubbed in a reverse direction at a rubbing intensity RS2 changing from 321 (mm) to 7 (mm). The thus-treated respective pairs of substrates showed pretilt angles $\alpha$ $(=|\alpha_{av}|)$ as shown in Table 1 appearing hereinafter.

Then, onto one of each pair of substrates subjected to the above aligning treatment, silica beads having an average particle size of 1.5 μm were dispersed, and the other substrate was superposed thereon so that their normal rubbing directions (and accordingly also the reverse rubbing directions) were parallel and identical to each other to form a cell.

Then, each cell was filled with a mixture liquid crystal A showing a phase transition series of Cry→SmC*→SmA→Iso. on temperature increase, a tilt angle (cone angle) Ⓗ of at least 25 degrees, an apparent tilt angle $\theta a$ of at least 20 degrees, a spontaneous polarization (Ps) of 20 nC/cm² and a smectic layer inclination angle $\delta$ of 6.5 degrees, respectively, in chiral smectic phase at 30° C. The filling was performed with the mixture liquid crystal A in isotropic phase, and the resultant cell was gradually cooled at a rate of 0.5° C./min to room temperature to effect alignment.

Figure 8:
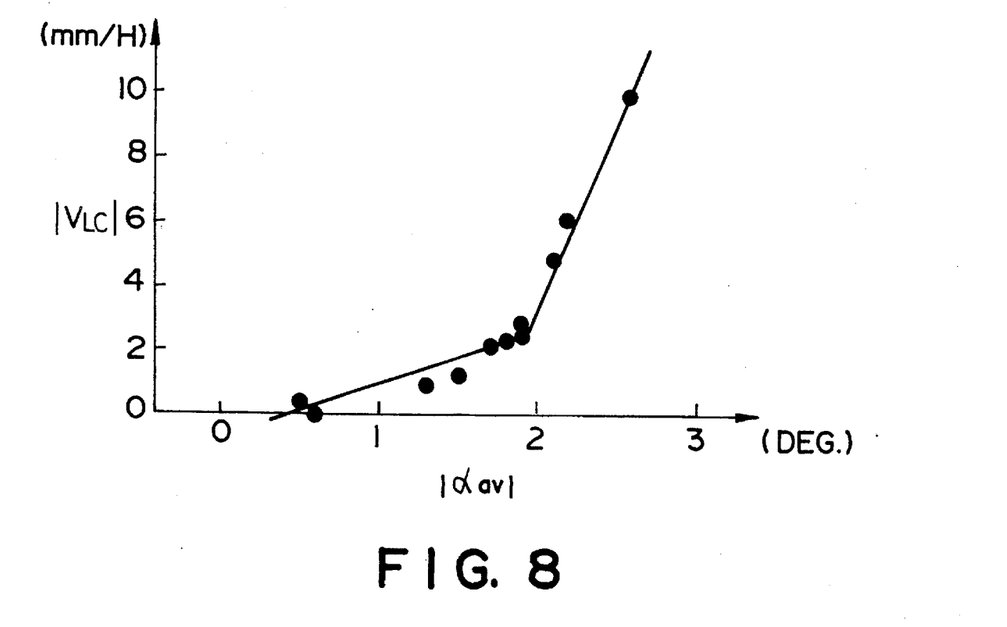
FIGS. 8 and 9 are respectively a graph showing a relationship between an average pretilt angle $|\alpha_{av}|$ of a device and a velocity of liquid crystal molecular movement obtained according to an experimental example.

The thus prepared respective liquid crystal cells were subjected to measurement of liquid crystal molecular movement speed in the above-described manner. The results are inclusively shown in Table 1 and FIG. 8 (a graph showing the plot of the movement speed relative to the average pretilt angle $|\alpha_{av}|$).

As is understood from the results, the liquid crystal molecular movement speed can be suppressed and the effect is remarkable when the pretilt angle $|\alpha_{av}|$ is controlled to be at most 2 degrees.

Example 2

Twelve pairs of 1.1 mm-thick glass substrates each provided with a ca. 150 nm-thick ITO transparent electrode film were provided similarly as in Example 1. A first substrate in each pair was coated with a 0.7 wt. % solution in an NMP/nBC (=2/1) mixture solvent of a polyimide precursor ("LP-64", mfd. by Toray K.K.) dripped thereon by spin coating at 2700 rpm for 20 sec., followed by drying at 80° C. for 5 min. and hot baking at 270° C. for 1 hour to form a 5 nm-thick alignment control film.

Twelve first substrates thus provided with an alignment control film in the above-described manner were subjected to an aligning treatment by rubbing with nylon cloth by using an apparatus shown in FIGS. 3A and 3B, so that they were first rubbed in a normal direction at a rubbing intensity RS1=214 (mm), and then rubbed in a reverse direction at a rubbing intensity RS2 changing from 321 (mm) to 7 (mm).

Separately, twelve second substrates in the twelve pairs were respectively coated with a 0.5 wt. % solution in ethyl alcohol of a silane coupling agent ("ODS-E") dipped thereon by spin coating at 2000 rpm for 20 sec but were not subjected to a rubbing treatment.

The thus-treated respective pairs of substrates are assumed to show pretilt angles $\alpha$ ($=|\alpha_{av}|$) shown in Table 1 for Example 1 obtained under the corresponding rubbing conditions based on some experimental results.

Then, onto one of each pair of substrates, silica beads having an average particle size of 1.5 µm were dispersed, and then other substrate was superposed thereon to form a cell.

Then, each cell was filled with the same mixture liquid crystal A as used in Example 1 in isotropic phase by injection under vacuum, and then gradually cooled at a rate of 0.5° C./min to room temperature to effect alignment.

Figure 9:
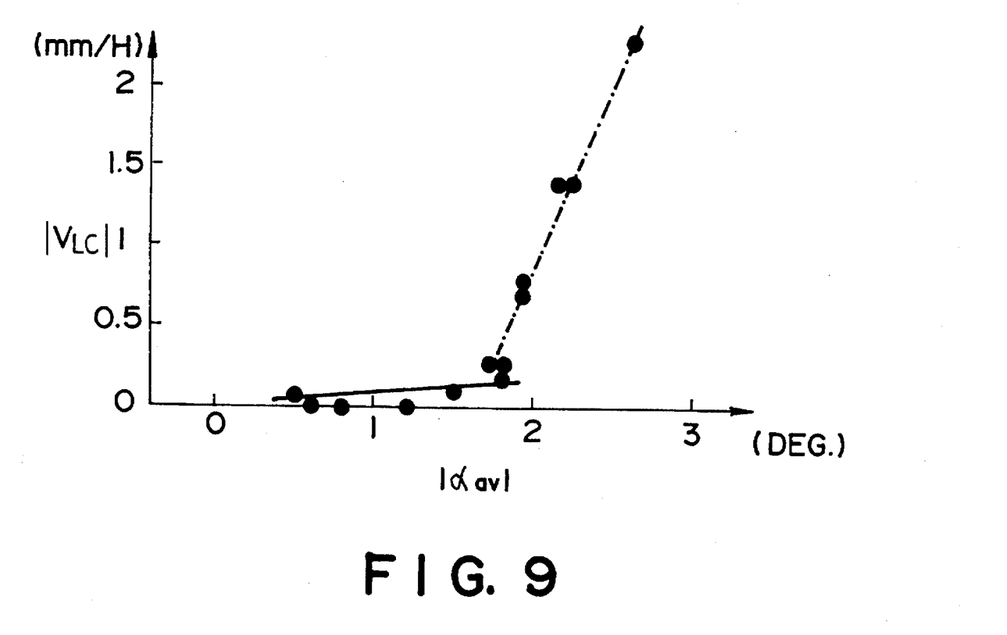

The thus prepared respective liquid crystal cells were subjected to measurement of liquid crystal molecular movement speed in the above-described manner. The results are inclusively shown in Table 1 and FIG. 9 (a graph showing the plot of the movement speed relative to the average pretilt angle $|\alpha_{av}|$).

The liquid crystal molecular movement speed could be suppressed and the effect was remarkable when the pretilt angle $|\alpha_{av}|$ was controlled to be at most 2 degrees. As is understood from the results, the liquid crystal molecular movement speed was even slower than in Example 1. This may be attributable to the asymmetrical alignment layer structure between the pair of substrates, which might have reduced the torque causing the movement.

TABLE 1

| Rubbing intensity | | Pretilt angle | Rate of LC movement $V_{LC}$ (mm/hr) | |
|---|---|---|---|---|
| RS1 | RS2 | $|\alpha_{av}|$ (deg.) | EX. 1 | EX. 2 |
| 214 | 321 | 2.2 | 6.0 | 1.4 |
| 214 | 214 | 2.1 | 4.8 | 1.4 |
| 214 | 107 | 1.9 | 3.0 | 0.8 |
| 214 | 73 | 1.9 | 2.6 | 0.7 |
| 214 | 40 | 1.8 | 2.3 | 0.3 |
| 214 | 29 | 1.8 | 2.2 | 0.2 |
| 214 | 22 | 1.7 | 2.0 | 0.3 |
| 214 | 18 | 1.5 | 1.2 | 0.1 |
| 214 | 14 | 1.3 | 0.8 | 0 |
| 214 | 11 | 0.6 | 0 | 0 |
| 214 | 7 | 0.5 | −0.4 | −0.1 |
| 214 | 0 | 2.6 | −9.8 | −2.3 |

Example 3

Twelve pairs of substrates were provided and subjected to an aligning treatment in the same manner as in Example 1.

Then, onto one of each pair of substrates, silica beads having an average diameter of 1.5 µm were dispersed, and the other substrate was superposed thereon so that their normal rubbing directions (and accordingly also the reverse rubbing directions) were parallel and opposite to each other (i.e., in a so-called anti-parallel arrangement).

The liquid crystal molecular movement was evaluated in the same manner as in Example 1.

As a result, the liquid crystal molecular movement was also effectively suppressed at a pretilt angle $|\alpha_{av}| \leq 2$ degrees.

Incidentally, throughout the above Examples 1–3, the liquid crystal molecular movement was also effectively suppressed at an average pretilt angle $\alpha$ of at most 2 degrees even when the applied voltage and temperature were changed to some extent. This tendency was also observed even when the cell thickness was increased to ca. 2 µm. Further, such cells having an average pretilt angle of at most 2 degrees also showed a decreased asymmetry of switching threshold between bistable states. Thus, it has been sufficiently proved that the objects of the present invention has been accomplished.

As is understood from the above experimental results, according to the liquid crystal device of the present invention, the liquid crystal molecular movement causing a change in liquid crystal layer thickness can be effectively suppressed, and a good switching characteristic and also a homogeneous uniform alignment state providing a high contrast are realized. Accordingly, the liquid crystal device according to the present invention is suitable for constituting liquid crystal apparatus, such as a light valve and a display apparatus, in combination with various drive circuits therefor.

What is claimed is:

1. A liquid crystal device, comprising:
a pair of substrates, and a chiral smectic liquid crystal disposed between the two substrates, said liquid crystal assuming at least two stable states including two stable states under no voltage application, at least one of the substrates having been subjected to a uniaxial aligning treatment in two directions including a normal direction and a reverse direction substantially opposite to the normal direction, wherein the liquid crystal is placed in an alignment state such that the liquid crystal provides an apparent tilt angle θa which is half of an angle between said two stable states under no voltage application, a tilt angle Ⓗ and an average pretilt angle α of at most 2° with respect to a substrate surface, and forms smectic layers forming an inclination angle δ from a normal to the substrate surfaces satisfying: Ⓗ/2<θa≦Ⓗ and Ⓗ>α+δ.

2. A device according to claim 1, wherein said uniaxial aligning treatment comprises rubbing.

3. A device according to claim 1, wherein a relationship of Ⓗ/2>α+δ is satisfied.

4. A device according to claim 1, wherein the liquid crystal provides an average smectic layer inclination angle δ of at most 8 degrees.

5. A device according to claim 1, wherein a plurality of pixels are formed between the pair of substrates, and the liquid crystal in a pixel forms regions of different pretilt and provides an average pretilt angle α of at most 2 degrees over the pixel.

6. A device according to claim 1, wherein a plurality of pixels are formed between the substrates, and the liquid crystal forms regions of different smectic layer inclinations in a pixel and provides an average smectic layer inclination angle of at most 8 degrees.

7. A device according to claim 1, wherein said uniaxial aligning treatment is a rubbing treatment, which is first effected in a normal direction and then in a reverse direction at a rubbing intensity which is smaller than that in the normal direction.

8. A device according to claim 7, wherein the rubbing intensity in the normal direction and the rubbing intensity in the reverse direction is set to a ratio in the range of 30:1 to 3:1.

9. A device according to claim 1, wherein said uniaxial aligning treatment is a rubbing treatment, which is performed in plural cycles each including a rubbing treatment in the normal direction and a rubbing treatment in the reverse direction in this sequence.

10. A device according to claim 9, wherein the rubbing treatment is effected at a successively weaker rubbing intensity in the plural cycles.

11. A device according to claim 1, wherein the chiral smectic liquid crystal has a phase transition series not including cholesteric phase.

12. A device according to claim 1, wherein one of the pair of substrates is subjected to the uniaxial aligning treatment and the other retains a non-uniaxial surface.

13. A device according to claim 12, wherein the uniaxial aligning treatment is a rubbing treatment.

14. A device according to claim 12, wherein the chiral smectic liquid crystal has a phase transition series not including cholesteric phase.

15. A liquid crystal device, comprising:

a pair of substrates, and a chiral smectic liquid crystal disposed between the two substrates, said chiral smectic liquid crystal having a phase transition series including no cholesteric phase, at least one of the substrates having been subjected to a uniaxial aligning treatment in two directions including a normal direction and a reverse direction substantially opposite to the normal direction, wherein the liquid crystal provides an average pretilt angle $\alpha$ of at most 2°.

16. A device according to claim 15, wherein said uniaxial aligning treatment comprises rubbing.

17. A device according to claim 15, wherein the liquid crystal provides an average smectic layer inclination angle $\delta$ of at most 8 degrees.

18. A device according to claim 15, wherein a plurality of pixels are formed between the pair of substrates, and the liquid crystal in a pixel forms regions of different pretilt and provides an average pretilt angle $\alpha$ of at most 2 degrees over the pixel.

19. A device according to claim 15, wherein a plurality of pixels are formed between the substrates, and the liquid crystal forms regions of different smectic layer inclinations in a pixel and provides an average smectic layer inclination angle of at most 8 degrees.

20. A device according to claim 15, wherein said uniaxial aligning treatment is a rubbing treatment, which is first effected in a normal direction and then in a reverse direction at a rubbing intensity which is smaller than that in the normal direction.

21. A device according to claim 20, wherein the rubbing intensity in the normal direction and the rubbing intensity in the reverse direction is set to a ratio in the range of 30:1 to 3:1.

22. A device according to claim 15, wherein said uniaxial aligning treatment is a rubbing treatment, which is performed in plural cycles each including a rubbing treatment in the normal direction and a rubbing treatment in the reverse direction in this sequence.

23. A device according to claim 22, wherein the rubbing treatment is effected at a successively weaker rubbing intensity in the plural cycles.

24. A device according to claim 15, wherein one of the pair of substrates is subjected to the uniaxial aligning treatment and the other retains a non-uniaxial surface.

25. A device according to claim 24, wherein the uniaxial aligning treatment is a rubbing treatment.

26. A liquid crystal apparatus comprising: a liquid crystal device according to any one of claims 1–3, 4–16, and 17–25, and means for driving the liquid crystal device.

27. A device according to claim 1 or 24, wherein said chiral smectic liquid crystal has a phase transition series of isotropic phase, smectic A phase, chiral smectic phase and crystal.

* * * * *

UNITED STATES PATENT AND TRADEMARK OFFICE
CERTIFICATE OF CORRECTION

PATENT NO. : 5,568,295

DATED : October 22, 1996

INVENTOR(S): KATSUTOSHI NAKAMURA ET AL.

It is certified that error appears in the above-identified patent and that said Letters Patent is hereby corrected as shown below:

[54] TITLE

Line 1, "SMETIC" should read --SMECTIC--.

COLUMN 1

Line 1, "SMETIC" should read -- SMECTIC--.

COLUMN 3

Line 28, "show" should read --shows--.

COLUMN 4

Line 9, "crystal" should read --crystal,--.
    Line 38, "Blodget)" should read --Blodgett)--.

COLUMN 5

Line 51, "of a" should read --a--.

COLUMN 7

Line 13, "pretilt $\alpha$" should read --pretilt angle $\alpha$--.

COLUMN 8

Line 44, "an" should read --and--.
    Line 61, "at" should read --in--.
    Line 64, "applying" should read --orienting--.
    Line 65, "each" should read --opposed to each--.

UNITED STATES PATENT AND TRADEMARK OFFICE
CERTIFICATE OF CORRECTION

PATENT NO. : 5,568,295

DATED : October 22, 1996

INVENTOR(S) : KATSUTOSHI NAKAMURA ET AL.          Page 2 of 2

It is certified that error appears in the above-identified patent and that said Letters Patent is hereby corrected as shown below:

COLUMN 12

Line 16, "has" should read --have--.

COLUMN 14

Line 33, "claims 1-3, 4-16, and 17-25," should read
      --claims 1 to 25,--.

Signed and Sealed this

First Day of April, 1997

Attest:

BRUCE LEHMAN

Attesting Officer     Commissioner of Patents and Trademarks